UNITED STATES PATENT OFFICE.

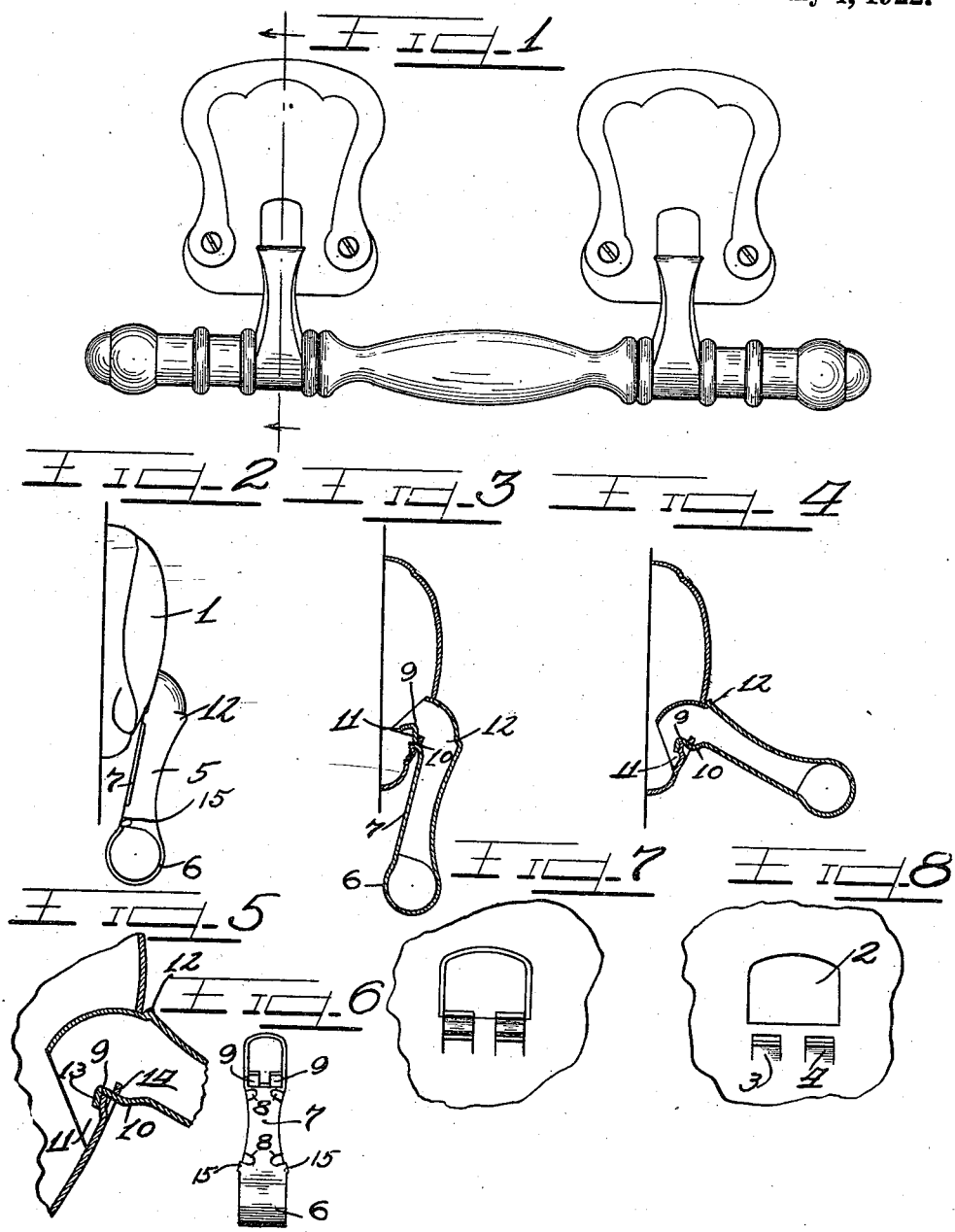

WESLEY E. SEASTROM, OF DUBUQUE, IOWA, ASSIGNOR TO SCHMID MANUFACTURING COMPANY, OF DUBUQUE, IOWA, A COPARTNERSHIP CONSISTING OF B. C. SCHMID AND F. W. SCHMID.

HANDLE JOINT.

1,421,848.   Specification of Letters Patent.   Patented July 4, 1922.

Application filed August 30, 1920. Serial No. 406,992.

*To all whom it may concern:*

Be it known that I, WESLEY E. SEASTROM, a citizen of the United States, and a resident of the city of Dubuque, in the county of Dubuque and State of Iowa, have invented certain new and useful Improvements in a Handle Joint; and I do hereby declare that the following is a full, clear, and exact description of the same, reference being had to the accompanying drawings, and to the numerals of reference marked thereon, which form a part of this specification.

This invention relates to an improved handle joint and particularly to a stamped metal handle joint construction which is adapted to be used in casket handles and similar hardware. These handles are ordinarily engaged in the base member, and it is desirable that a construction be provided whereby said handles form a strong interlocked joint with the base member and have a sufficient bearing surface thereon to carry any loads which may be imposed.

It is also desirable that the handles be of economical construction and of such form that they may be easily assembled with the base member.

It is an important object, therefore, of this invention to provide a handle which is adapted to be easily assembled with a base member and which has a plurality of portions of the surface thereof adapted to bear on said base member.

It is also an important object of this invention to provide a stamped metal handle which is adapted to be conveniently assembled in a base member in interlocking relation.

Other and further important objects of this invention will be apparent from the disclosures in the specification and the accompanying drawings.

The invention (in a preferred form) is shown on the drawings and hereinafter more fully described.

On the drawings:

Figure 1 is a view in elevation showing the improved handle of this invention used as a casket handle.

Figure 2 is an end elevation of the handle.

Figure 3 is a section on the line 3—3 of Figure 1.

Figure 4 is a view similar to Figure 3 showing the handle in raised position.

Figure 5 is an enlarged sectional detail showing the manner in which the handle bears on the base member.

Figure 6 is a rear elevation of the handle.

Figure 7 is a fragmentary elevation of the inside of the base member with the handle in the position shown in Figure 3.

Figure 8 is a view similar to Figure 7 with the handle removed from the base member.

As shown on the drawings:

Figure 1 shows the handles of this invention as arranged when used for supporting a casket hand rail. Said handles are supported in base members 1, which are provided with openings 2, as clearly shown in Figures 3, 4, 7 and 8. Three-sided openings are provided in the base 1 directly beneath the openings 2 and the metal from said openings is forced inwardly to provide tongues 3 and 4. The handle which is indicated by the reference numeral 5, is formed from a single piece of stamped metal which is cut away at the bottom and bent upwardly to provide a loop 6 for supporting a hand rail or other suitable hand grip, and said upwardly bent portion extends upwardly from said loop 6 to form the inner side 7 of the handle, the outer portion of the handle being secured to said inner side 7 by means of integral tongues 8 bent downwardly thereover. A pair of tongues 9, which are adapted to be engaged through the openings below the opening 2 in the base 1, are formed on the upper end of said portion 7, said tongues being bent outwardly from the handle at 10, as shown in Figures 3, 4, and 5. The upper end of the outer portion of the handle 5 is bent inwardly to engage through the opening 2 in the base 1 and said inwardly bent portion is provided with extensions 11, which afford a surface adapted to bear against the inner face of the base 1 when the handle is in raised position, as shown in Figures 4 and 5. An integral stop 12 is provided on the outer face of the handle 5, at the point where said handle begins to bend inwardly, and said stop 12 is adapted to engage the outer face of the base member 1 when the handle is in raised position. In assembling the handle 5 in the base member 1, the upper portion thereof is engaged through the opening 2 and the tongues 9 are engaged through the openings therebeneath, and after being so engaged through said openings said tongues 9 are bent downwardly to form portions 13, which are adapted to engage the inner side of the tongues 3 and 4 when the handle is raised. It is also apparent that when the handle is raised, the inner side of said tongues 9 engage a portion 14 of the base 1 between the opening 2 and the three-sided opening therebeneath. In order to strengthen the handle above the hand grip or hand rail opening and to prevent spreading of the metal a pair of lugs or tongues 15 are formed on the portion 7 and bent over the sides of the handle 5 as shown in Figures 2 and 6.

When the handle is in lowered position, as shown in Figure 3, the outwardly bent portions 10 of the tongues 9 of course engage the outer faces of the tongues 3 and 4, as clearly shown in Figure 3. It is thus apparent that a double, interlocking joint is provided, and that when the handle is raised portions of the surface thereof bear at different points on the base member 1, distributing the load on said base member and affording a strong joint. These bearing surfaces comprise the inner side of the projections 11, the boss 12 and the outer side of the downwardly bent portions 13 of the tongues 9. On account of the provision of the outwardly bent portion 10, the handle is also held firmly in the downward position shown in Figure 3 and there is little likelihood of said handle rattling when in such downward position.

Since the handle and base member are each made from single pieces of stamped metal, the construction of this invention is an economical one. Because of the peculiar interlocking relation between said handle and base member and the large amount of bearing surface of the handle on said base member, the construction provided is strong and durable.

I am aware that numerous details of construction may be varied through a wide range without departing from the principles of this invention, and I therefore do not purpose limiting the patent granted otherwise than necessitated by the prior art.

I claim as my invention:

1. The combination with a base member having spaced openings of different sizes therein, of a handle engaged through the largest of said openings, and extensions on said handle engaged through the smaller openings and bent downwardly inside the base member.

2. The combination with a base member having openings of different size therein, of a handle engaged through the largest of said openings, and extensions bent outwardly from the handle engaged through the smaller openings and bent downwardly inside the base member.

3. A handle comprising a tubular piece of sheet metal having an opening at the end of the tube, two lugs integral with the metal of said tube and located adjacent said opening, each of said lugs being bent at two places so that the lug consists of three portions in three directions, whereby the lugs are offset downward from the body of the handle.

4. A handle formed of a tubular member, two tongues on one face of said member, and a base plate having slots with which said tongues cooperate.

5. In a handle, a base plate having two aligned slots, and a tubular member having two extensions in one plane cooperating with said slots.

6. In a handle, a base plate having an opening therein and two other openings adjacent one edge of the first opening, tongues struck inward at each of said two openings, a tubular member having two tongues each projecting through one of said two openings, said tongues being curved so that each of the tongues on the base plate fits against a portion of one face of one of the tongues on the tubular member when said tubular member is in one position, another portion of the same face of the tongue on said tubular member contacting with the opposite face of the tongue on said base plate when the tubular member is in a different position and the end of said tubular member projecting through the first named opening in the base plate in both positions.

7. In a handle, a tubular member formed of one piece of metal and having a flat side, tongues on the flat side engaging the adjacent sides, tongues on said adjacent sides engaging said flat side, and a loop connecting said flat side with the opposite side.

8. In a handle, a tubular member formed of one piece of metal and having a flat side, tongues on the flat side engaging the adjacent sides, tongues on said adjacent sides engaging said flat side, and a loop connecting said flat side with the opposite side, tongues on the end of said flat side opposite said loop, and a base member having openings with which said last named tongues cooperate.

9. In a handle, a base member, a tubular member, the base member having an opening through which the tubular member engages, means at the bottom of the opening and on the bottom side of the tubular member to pivot the tubular member to the base member, the upper side of the tubular member being curved to contact with the upper edge of the opening in all positions of the tubular member, and extensions on the lateral sides of the tubular member the edges of which contact with the base member when the tubular member is in its highest position.

10. In combination, a base member and a handle, the handle having four faces, and means on each face for coacting with the base member to distribute the load when the handle is raised.

In testimony whereof I have hereunto subscribed my name in the presence of two subscribing witnesses.

WESLEY E. SEASTROM.

Witnesses:
  WM. H. KELER,
  CHRIS. A. VOELKER.